(12) United States Patent
Vargas et al.

(10) Patent No.: US 11,394,831 B1
(45) Date of Patent: Jul. 19, 2022

(54) SYSTEM AND METHODS FOR DYNAMICALLY ROUTING AND RATING CUSTOMER SERVICE COMMUNICATIONS

(71) Applicant: Capital One Services, LLC, McLean, VA (US)

(72) Inventors: Cruz Vargas, Denver, CO (US);
Phoebe Atkins, Rockville, VA (US);
Rajko Ilincic, Annandale, VA (US);
Matthew Peroni, Bedford, MA (US);
Lin Ni Lisa Cheng, New York, NY (US); Deny Daniel, Medford, MA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 17/403,094

(22) Filed: Aug. 16, 2021

(51) Int. Cl.
*H04M 3/523* (2006.01)
*G06N 20/00* (2019.01)
*G10L 25/63* (2013.01)
*H04M 3/51* (2006.01)
*H04M 3/42* (2006.01)

(52) U.S. Cl.
CPC ......... *H04M 3/5233* (2013.01); *G06N 20/00* (2019.01); *G10L 25/63* (2013.01); *H04M 3/42348* (2013.01); *H04M 3/42382* (2013.01); *H04M 3/5175* (2013.01); *H04M 3/5237* (2013.01); *H04M 2203/408* (2013.01)

(58) Field of Classification Search
CPC ............. H04M 3/5233; H04M 3/5175; H04M 3/5237; H04M 2203/408; G06N 20/00; G10L 25/63
USPC ............ 379/265.12, 265.11, 265.02, 265.05, 379/265.06, 265.07, 265.08, 265.13, 379/265.01
See application file for complete search history.

(56) References Cited

U.S. PATENT DOCUMENTS

| 6,411,687 | B1 | 6/2002 | Bohacek et al. | |
|---|---|---|---|---|
| 7,940,186 | B2 | 5/2011 | Aaron et al. | |
| 9,014,365 | B1 | 4/2015 | Castiglione | |
| 2016/0210602 | A1* | 7/2016 | Siddique | ............... G06Q 20/384 |
| 2016/0371703 | A1* | 12/2016 | Mon | ...................... H04L 67/148 |

* cited by examiner

*Primary Examiner* — Thjuan K Addy
(74) *Attorney, Agent, or Firm* — Troutman Pepper Hamilton Sanders LLP; Christopher J. Forstner; John A. Morrissett

(57) ABSTRACT

A system for dynamically routing customer calls. For example, the system may receive user interaction data associated with a first user using a first user device. The system may also receive a phone call from a user using a first phone number. The system may also identify the user via the first phone number. The system may determine, using a first machine learning model, whether the first user has a first emotion type based on the user interaction data. When the first user does not have the first emotion type, the system may route the first user to any call center representative. When the first user has the first emotion type, the system may route the first user to a first call center representative among one or more first call center representatives.

20 Claims, 5 Drawing Sheets

SYSTEM AND METHODS FOR DYNAMICALLY ROUTING AND RATING CUSTOMER SERVICE COMMUNICATIONS

FIELD

The disclosed technology relates to systems and methods for dynamically routing and rating customer calls. In particular, the disclosed technology relates to determining whether a user has a first emotion type and routing that customer to a particular call center representative if the user has the first emotion type.

BACKGROUND

Customers want to have a seamless, quick interaction with customer service member especially if they are experiencing a problem. Organizations similarly want to provide customers with a seamless, quick interaction when a customer communicates with the organization, e.g., via a call or textual chat. To help provide this quick customer service, many organizations outsource or internally hire call center representatives who often having different experience and training levels. Some call center representatives with low amounts of experience or training, while often having a lower salary cost than more experienced representatives, may not be equipped to handle a call with a customer that is angry or extremely frustrated. This can lead to issues when existing call center systems, which assign customers call randomly or based on availability, direct a customer call to an inappropriate representative. That is, while existing call center systems may seemingly improve customer service by lowering the wait time to reach a call center representative, they often actually increase the total time the customer is on a call. This added call time can exacerbate an already frustrated customer and potentially lose customers or new business while also tying up call center representatives for longer than necessary.

Additionally, some call center representatives with large amounts of experience or training could become frustrated if they are helping with the same simple tasks (e.g., password reset or account cancellation) that a call center representative with low amounts of training or experience could handle thereby reducing the effectiveness of these call center representatives resolving complex issues. Over time this could lead to frustrated experienced call center representatives leaving the organization or outsourced organization.

Accordingly, there is a need for improving the routing of customer calls to call centers representatives. Embodiments of the present disclosure are directed to this and other considerations.

SUMMARY

Disclosed embodiments may include a system for dynamically routing and rating customer calls. The system may include one or more processors, and memory in communication with the one or more processors and storing first instructions that are configured to cause the system to perform a method for dynamically routing and rating customer calls. For example, the system (e.g., routing and rating system 420) may receive user interaction data associated with a first user using a first user device (e.g., user device 502) and may receive a phone call from the first user using a first phone number. The system (e.g., routing and rating system 420) may track a call duration of the phone call, identify the first user via the first phone number, and receive one or more utterances via the phone call. The system (e.g., routing and rating system 420) may identify one or more issues from the one or more utterances. The system (e.g., routing and rating system 420) may determine, using a first machine learning model, whether the first user has a first emotion type based on the user interaction data, a tone of voice associated with the one or more utterances, word choice associated with the one or more utterances, talking speed associated with the one or more utterances, or combinations thereof. When the first user does not have the first emotion type, the system (e.g., routing and rating system 420) may route the phone call to any call center representative. When the first user has the first emotion type, the system (e.g., routing and rating system 420) may route the phone call to a call center representative associated with an average call score that is above a predetermined threshold. Regardless on which call center representative the call has been routed to, the system (e.g., routing and rating system 420) may prompt the first user for first feedback after the issue is resolved or the phone call ends and may receive the first feedback from the first user (e.g., via user device 502). The system (e.g., routing and rating system 420) may generate a call score for an assigned call center representative based the one or more issues, the call duration, the first feedback, and the determination of whether the first user had the first emotion type. The system (e.g., routing and rating system 420) may update the average call score associated with the assigned call center representative based on the call score. The system (e.g., routing and rating system 420) may also prompt the assigned call center representative to provide second feedback on whether the first user has the first emotion type and may receive the second feedback from the assigned call center representative. Finally, the system (e.g., routing and rating system 420) may update the first machine learning model based on the first feedback, the second feedback, or both.

Disclosed embodiments may include a system for dynamically routing and rating customer calls. The system may include one or more processors, and memory in communication with the one or more processors and storing first instructions that are configured to cause the system to perform a method for dynamically routing and rating customer calls. For example, the system (e.g., routing and rating system 420) may receive user interaction data associated with a first user using a first user device, may receive a phone call from a user using a first phone number, and may receive one or more utterances from the first user via the phone call. The system (e.g., routing and rating system 420) may identify the user via the first phone number, may track a call duration for the phone call, and may identify one or more issues from the one or more utterances. The system (e.g., routing and rating system 420) may determine, using a first machine learning model, whether the first user has a first emotion type based on the user interaction data. When the first user does not have the first emotion type, the system (e.g., routing and rating system 420) may route the first user to any call center representative. When the first user has the first emotion type, system (e.g., routing and rating system 420) may route the first user to a call center representative associated with an average call score that is above a predetermined threshold. The system (e.g., routing and rating system 420) may prompt the first user for first feedback after the issue is resolved or the phone call ends, may receive the first feedback from the first user, and may generate a call score for an assigned call center representative based the one or more issues, the call duration, the first feedback, and the determination of whether the first user had the first emotion type. Finally, the system (e.g., routing and rating system 420) may update the average call score associated with the assigned call center representative.

Disclosed embodiments may include a system for dynamically routing customer calls. The system may include one or more processors, and memory in communication with the one or more processors and storing first instructions that are configured to cause the system to perform a method for dynamically routing customer calls. For example, the system (e.g., routing and rating system 420) may receive user interaction data associated with a first user using a first user device (e.g., user device 502). The system (e.g., routing and rating system 420) may also receive a phone call from a user using a first phone number. The system (e.g., routing and rating system 420) may also identify the user via the first phone number. The system (e.g., routing and rating system 420) may determine, using a first machine learning model, whether the first user has a first emotion type based on the user interaction data. When the first user does not have the first emotion type, the system (e.g., routing and rating system 420) may route the first user to any call center representative. When the first user has the first emotion type, the system (e.g., routing and rating system 420) may route the first user to a first call center representative among one or more first call center representatives.

Further features of the disclosed design, and the advantages offered thereby, are explained in greater detail hereinafter with reference to specific embodiments illustrated in the accompanying drawings, wherein like elements are indicated by like reference designators.

BRIEF DESCRIPTION OF THE DRAWINGS

Reference will now be made to the accompanying drawings, which are not necessarily drawn to scale, and which illustrate various implementations, aspects, and principles of the disclosed technology. In the drawings.

DETAILED DESCRIPTION

Examples of the present disclosure relate to systems and methods for dynamically routing and rating customer calls. More particularly, the disclosed technology relates to determining whether a user has a first emotion type and routing that customer to a particular call center representative if the user has the first emotion type. The systems and methods described herein are necessarily rooted in computer and technology as they relate to dynamically determining a user's emotion and routing the user to an experienced caller if the user has a particular emotion type (e.g., angry or frustrated). In some instances, the system utilizes a machine learning model to determine when the ATM is busy. Machine learning models are a unique computer technology that involves training the models to complete tasks, such as labeling, categorizing, or determining whether a user's user interaction data (e.g., repeated tapping a link or icon within an application) is associated with a particular emotion type so the machine learning models learn how to label, categorize, or determine a particular emotion type. Importantly, examples of the present disclosure improve the speed with which computers can determine an emotion type and assign the appropriate call center representative based on the determination.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods.

Reference will now be made in detail to example embodiments of the disclosed technology that are illustrated in the accompanying drawings and disclosed herein. Wherever convenient, the same reference numbers will be used throughout the drawings to refer to the same or like parts.

Figure 1:
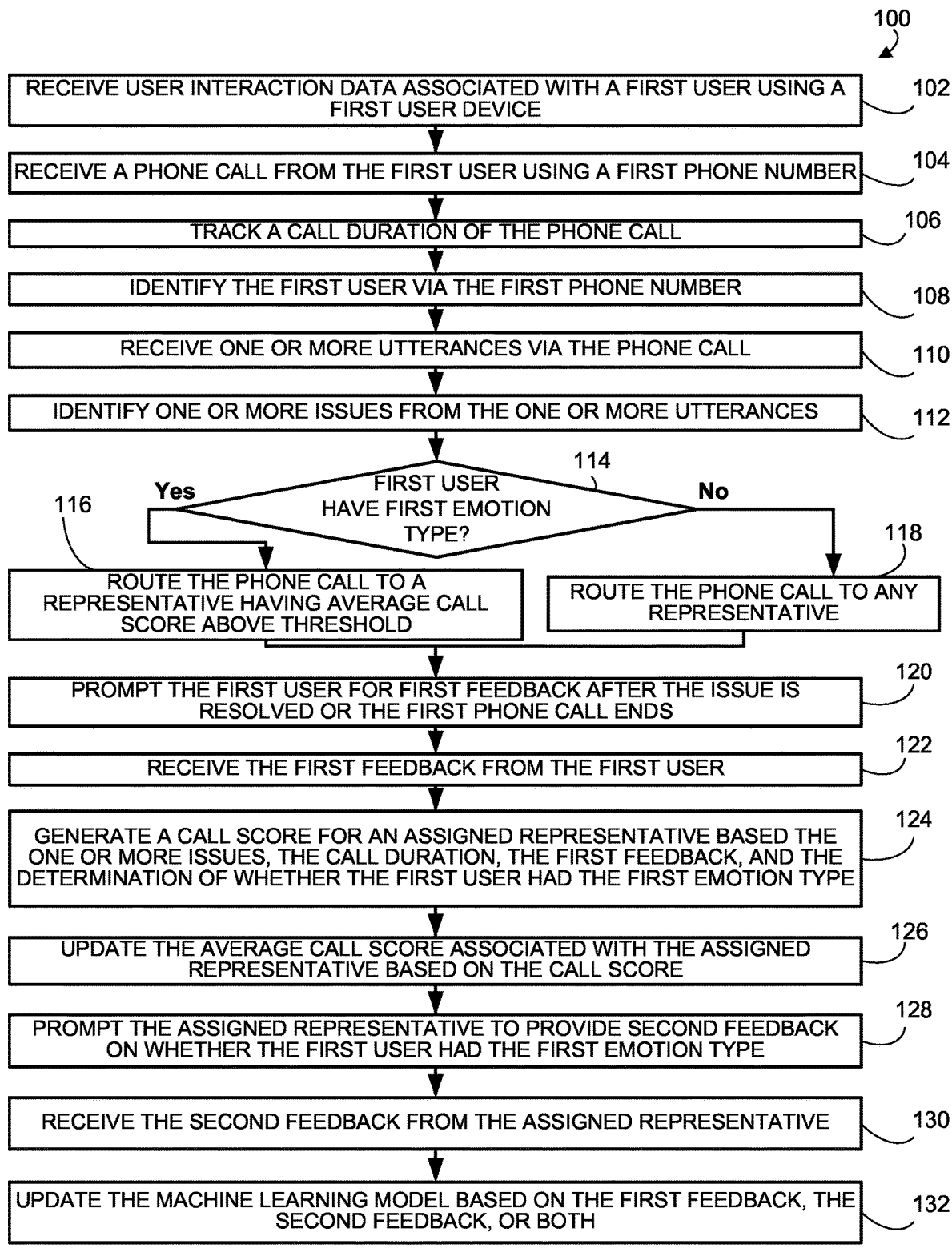
FIG. 1 is a flow diagram illustrating an exemplary method for dynamically routing customer service calls, in accordance with certain embodiments of the disclosed technology.

FIG. 1 is a flow diagram illustrating an exemplary method 100 for method for dynamically routing customer service calls, in accordance with certain embodiments of the disclosed technology. The steps of method 100 may be performed by one or more components of the system 500 (e.g., routing and scoring system 420 or web server 510 of user contact system 508 or user device 502), as described in more detail with respect to FIGS. 4 and 5.

In block 102, the routing and scoring system 420 may receive user interaction data (e.g., clicks, taps, click or tap frequency, page views, repeated page view, or repeated error messages) associated with a first user using a first user device 502 from the first user device 502. User interaction data may include repeated actions by the user in a mobile application installed on a user device 502. For example, the first user may repeatedly try to conduct the same transaction, which is recorded by the mobile banking application on user device 502 and sent to and received by the routing and rating system 420. Alternatively or in addition, the user interaction data may include the first user repeatedly shaking or other motion data (e.g., a particular angle or rotation a user is holding their phone) sensed by a user device's gyroscope, which may be sent to and received by the routing and rating system 420. Alternatively or in addition, the user interaction data may include chat session data between the first user and an automated chat bot, a customer representative, or an artificial intelligence (AI) chat bot. Alternatively or in addition, the user interaction data may include global positioning system (GPS) data associated with the first user device (e.g., user device 502).

In block 104, the routing and scoring system 420 may receive a phone call from the first user using a first phone number. For example, the first user may call with their user device 502 an organization via their customer service number which is associated with and/or initialed routed to the routing and scoring system 420.

In block 106, the routing and scoring system 420 may track a call duration of the phone call. For example, the routing and scoring system 420 may store the start time of the phone call.

In block 108, the routing and scoring system 420 may identify the first user via the first phone number. For example, the routing and scoring system 420 may compare the phone number associated with the phone call with one or more stored phone numbers associated with first user. If the routing and scoring system 420 determines that the first phone number is different from one or more stored phone numbers associated with the first user, the routing and scoring system 420 may prompt the eventually assigned call center representative to perform additional authentication checks such as asking for the first user's birthdate or social security number.

In block 110, the routing and scoring system 420 may receive one or more utterances via the phone call. For example, the first user may explain who they are by stating identifying information such as an account number, a social security number, or a birthdate and why they are calling. In other embodiments, the routing and scoring system 420 may receive identifying information such as an account number, a social security number, or a birthdate in the form of touch tone data via the phone call from the user typing into a key pad numbers corresponding to the identifying information.

In block 112, the routing and scoring system 420 may identify one or more issues from the one or more utterances. The routing and scoring system 420 may use a natural language processing model or device (e.g., natural language processing system 530) to perform this step. If the issues involved (e.g., such as unable to check a user's account balances) involve sensitive information (e.g., account balances, account numbers, transfer records), the routing and scoring system 420 may prompt the eventually assigned call center representative to perform additional authentication checks such as asking for the first user's birthdate or social security number.

In block 114, the routing and scoring system 420 may determine, using a first machine learning model, whether the first user has a first emotion type based on the user interaction data, a tone of voice associated with the one or more utterances, word choice associated with the one or more utterances, talking speed associated with the one or more utterances, or combinations thereof. For example, the routing and scoring system 420 may determine that the first user has the first emotion type (e.g., angry or frustrated) by determining that user interaction data of the first user corresponds to the user trying to perform an action on their mobile banking application 15 times or clicked a button 5 times. In another example, the routing and scoring system 420 may determine that the first user's user interaction data corresponding to a previous textual chat session the first user had with a customer service representative indicated the first user was angry (e.g., the first user could have typed, "This makes me angry.") indicates that the first user has the first emotion type. Other examples, may include analyzing the first user's one or more utterances for tone of voice (e.g., loud or yelling), word choice (e.g., states the word "angry" or "frustrated"), and/or talking speed (e.g., the first user is talking above a threshold talking speed). When the machine learning model utilized by the routing and scoring system 420 analyzes this user interaction data and/or one or more of these characteristics of the one or more utterances, the routing and scoring system 420 may label or determine that the user has a first emotion type (e.g., angry or frustrated). In some embodiments, the machine learning model takes into account whether the GPS data (as part of the user interaction data) indicates that the first user is at home or not and when the first user is at home the machine learning model may weigh that the user is more likely to not be angry as opposed to if the GPS data indicates the user is not at home. When the routing and scoring system 420 determines that the first user has the first emotion type, the method 100 may proceed to block 116. When the routing and scoring system 420 determines that the first user does not have the first emotion type, the method 100 may proceed to block 118.

In some embodiments, the routing and scoring system 420 may receive one or more audio signals from the first user via the first phone call. In some embodiments, the routing and scoring system 420 may determine whether the first user had the first emotion type based in part on the one or more audio signals. For example, the one or more audio signals may include background noise (e.g., traffic, music, and/or conversation). When the background noise in the one or more audio signals exceeds a predetermined decibel (db) threshold level (e.g., x db), the routing and scoring system 420 may, via the machine learning model, factor or weigh into the determination to determine whether the first user has the first emotion type. For example, if the background noise exceeds a certain decibel level, the user may be frustrated for having to call a customer service representative at a time that is less than ideal (i.e., not at home where a private and quiet conversation can take place).

In block 118, the routing and scoring system 420 may route the phone call to any call center representative. For example, the routing and scoring system 420 may route the phone call to the first available call center representative. Alternatively, the routing and scoring system 420 may route the phone call to equalize workload across call center representatives. For example, the routing and scoring system 420 may assign a call to a representative who has less calls in their queue than other call center representatives.

In block 116, the routing and scoring system 420 may route the phone call to a call center representative associated with an average call score that is above a predetermined threshold. Each call center representative may be assigned an average call score. For angry or frustrated callers, the organization associated with the routing and scoring system 420 and the call center representatives may set a predetermined threshold (e.g. an average call score of 80%) for handling the more difficult calls.

In block 120, the routing and scoring system 420 may prompt the first user for first feedback after the issue is resolved or the phone call ends. For example, the routing and scoring system 420 may transmit a message (e.g., SMS message, email, push notification, or textual chat message) requesting the user to rate the call on a scale from 1 to 5, with 5 being excellent.

In block 122, the routing and scoring system 420 may receive the first feedback from the first user.

In block 124, the routing and scoring system 420 may generate a call score for an assigned call center representative based on one or more issues, the call duration, the first feedback, and the determination of whether the first user had the first emotion type. For example, if there only one issue involved, the call was short (1-5 minutes), the first feedback was favorable (e.g., a rating of 4 or higher), and the routing and scoring system 420 determined that the first user had the first emotion type (e.g., angry or frustrated), the routing and scoring system 420 may generate a call score of 95%.

In block 126, the routing and scoring system 420 may update the average call score associated with the assigned call center representative based on the call score. For example, the call score of 95% would be included and averaged with the other call scores associated with the assigned call center representative. If a call center representative's average call score for a threshold number of calls exceeds the predetermined threshold for handling callers with a first emotion type, then the call center representee may be added to a list of call center representatives that qualify for handling calls with callers deemed to have the first emotion state.

In block 128, the routing and scoring system 420 may prompt the assigned call center representative to provide second feedback on whether the first user has the first emotion type. For example, the routing and scoring system 420 may transmit a message (e.g., SMS message, email, push notification, or textual chat message) requesting the assigned call center representative to answer yes or no on whether the first user had the first emotion type.

In block 130, the routing and scoring system 420 may receive the second feedback from the assigned call center representative.

In block 132, the routing and scoring system 420 may update the first machine learning model based on the first feedback, the second feedback, or both. In other words, the routing and scoring system 420 may train the first machine learning model based on the first feedback, the second feedback, or both.

Although method 100 focuses on a first emotion type, the method 100 may be used to route calls based on more than one emotion type such that certain call center representatives are qualified to handle calls for different emotion types. In some embodiments, separate machine learning models are used for each emotion type whereas other embodiments use one machine learning model to determine a first emotion type, a second emotion type, etc. The routing and scoring system 420 would continuous evaluate call center representatives competence (e.g., based on the average call score) in handling different emotions to ensure they continue to qualify for handling those calls for each emotion type.

Figure 2:
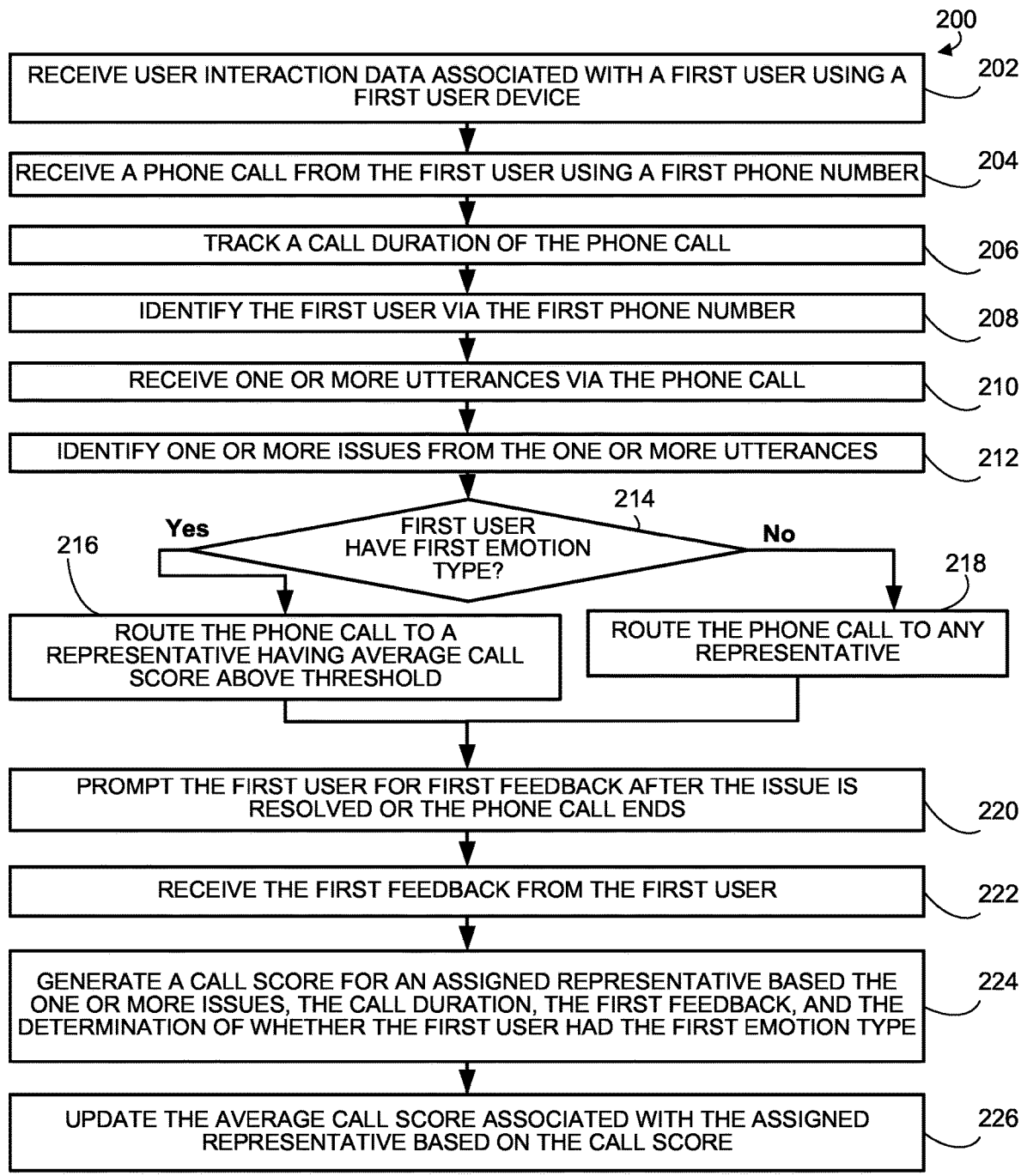
FIG. 2 is a flow diagram illustrating an exemplary method for dynamically routing customer service calls, in accordance with certain embodiments of the disclosed technology.

FIG. 2 is a flow diagram illustrating an exemplary method 200 for method for dynamically routing customer service calls, in accordance with certain embodiments of the disclosed technology. The steps of method 200 may be performed by one or more components of the system 500 (e.g., routing and scoring system 420 or web server 510 of user contact system 508 or user device 502), as described in more detail with respect to FIGS. 4 and 5.

Method 200 of FIG. 2 is similar to method 100 of FIG. 1, except that method 200 may not include blocks 128, 130, and 132 of method 100. The descriptions of blocks 202, 204, 206, 208, 210, 212, 216, 218, 220, 222, 224, and 226 in method 200 are similar to the respective descriptions of blocks 102, 104, 106, 108, 110, 112, 116, 118, 120, 122, 124, and 126 of method 100 and are not repeated herein for brevity. However, block 214 is slightly different from block 114 and is described below.

In block 214, the routing and scoring system 420 may determine, using a first machine learning model, whether the first user has a first emotion type based on the user interaction data. For example, the routing and scoring system 420 may determine that the first user has the first emotion type (e.g., angry or frustrated) by determining that user interaction data of the first user corresponds to the user trying to perform an action on their mobile banking application 15 times. In another example, the routing and scoring system 420 may determine that the first user's user interaction data corresponding to a previous textual chat session the first user had with a customer service representative indicated the first user was angry (e.g., the first user could have typed, "This makes me angry.") indicates that the first user has the first emotion type. Other examples, may include analyzing the first user's one or more utterances for tone of voice (e.g., loud or yelling), word choice (e.g., states the word "angry" or "frustrated"), and/or talking speed (e.g., the first user is talking above a threshold talking speed). When the machine learning model utilized by the routing and scoring system 420 analyzes this user interaction data and/or one or more of these characteristics of the one or more utterances, the routing and scoring system 420 may label or determine that the user has a first emotion type (e.g., angry or frustrated). In some embodiments, the machine learning model takes into account whether the GPS data (as part of the user interaction data) indicates that the first user is at home or not and when the first user is at home the machine learning model may weigh that the user is more likely to not be angry as opposed to if the GPS data indicates the user is not at home. When the routing and scoring system 420 determines that the first user has the first emotion type, the method 100 may proceed to block 216 (analogous to block 116). When the routing and scoring system 420 determines that the first user does not have the first emotion type, the method 100 may proceed to block 218 (analogous to block 118).

In some embodiments, the routing and scoring system 420 may receive one or more audio signals from the first user via the first phone call. In some embodiments, the routing and scoring system 420 may determine whether the first user had the first emotion type based in part on the one or more audio signals. For example, the one or more audio signals may include background noise (e.g., traffic, music, and/or conversation). When the background noise in the one or more audio signals exceeds a predetermined decibel (db) threshold level (e.g., x db), the routing and scoring system 420 may, via the machine learning model, factor or weigh into the determination to determine whether the first user has the first emotion type. For example, if there the background noise exceed a certain decibel level, the user may be frustrated since he or she feels they have to call a customer service representative at a time that is less than ideal (i.e., not at home where a private and quiet conversation can take place).

Figure 3:
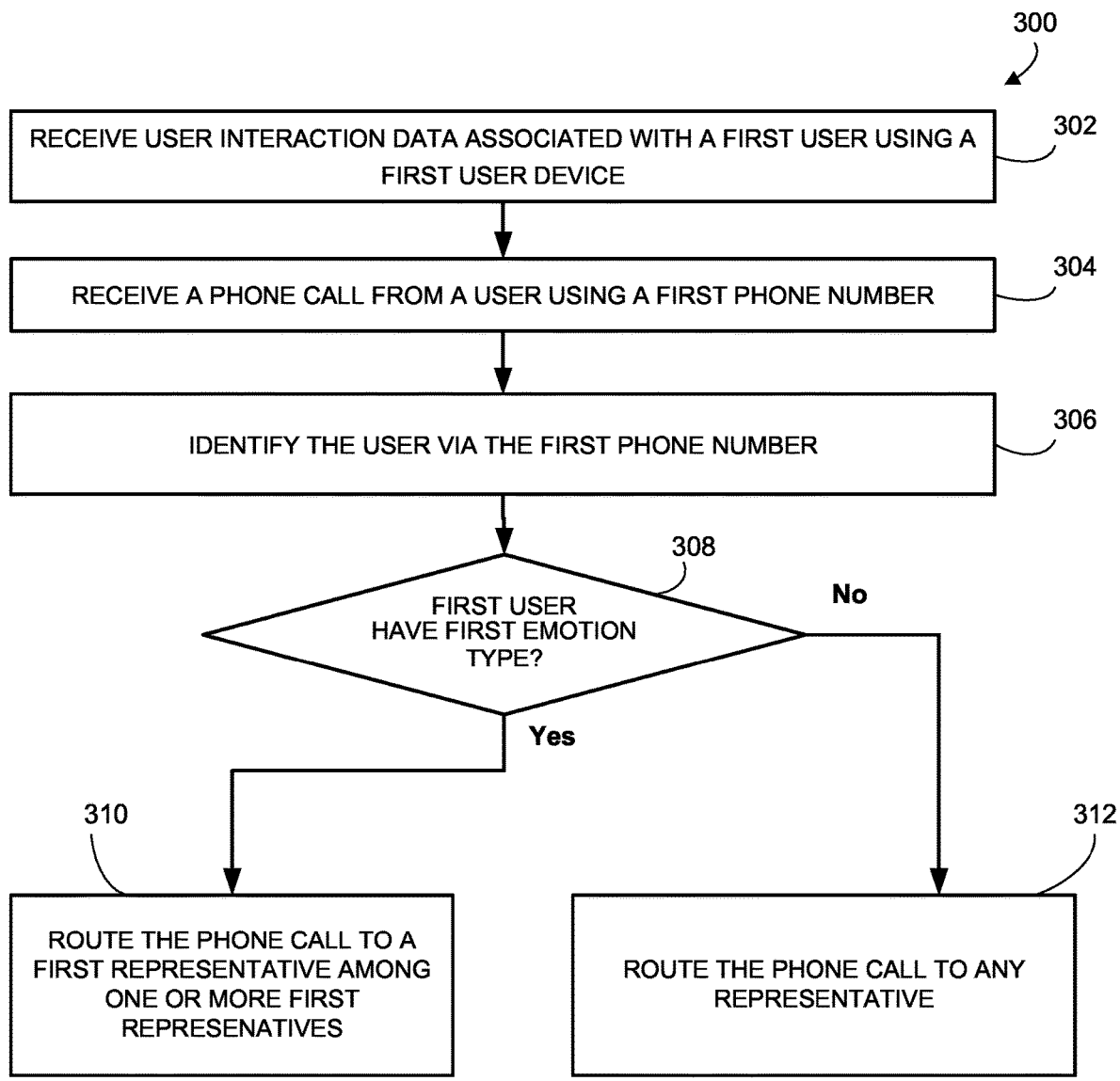
FIG. 3 is a flow diagram illustrating an exemplary method for dynamically routing customer service calls, in accordance with certain embodiments of the disclosed technology.

FIG. 3 is a flow diagram illustrating an exemplary method 300 for method for dynamically routing customer service calls, in accordance with certain embodiments of the disclosed technology. The steps of method 200 may be performed by one or more components of the system 500 (e.g., routing and scoring system 420 or web server 510 of user contact system 508 or user device 502), as described in more detail with respect to FIGS. 4 and 5.

Method 300 of FIG. 3 is similar to method 100 of FIG. 1, except that method 300 may not include blocks 106, 110, 112, 120, 122, 124, 126, 128, 130, and 132 from method 100. The descriptions of blocks 302, 304, 306, 310, and 312 in method 300 are similar to the respective descriptions of blocks 102, 104, 108, 116, and 118 of method 100 and are not repeated herein for brevity. However, block 308 is slightly different from block 114 and is described below.

In block 308, the routing and scoring system 420 may determine, using a first machine learning model, whether the first user has a first emotion type based on the user interaction data. For example, the routing and scoring system 420 may determine that the first user has the first emotion type (e.g., angry or frustrated) by determining that user interaction data of the first user corresponds to the user trying to perform an action on their mobile banking application 15 times. In another example, the routing and scoring system 420 may determine that the first user's user interaction data corresponding to a previous textual chat session the first user had with a customer service representative indicated the first user was angry (e.g., the first user could have typed, "This makes me angry.") indicates that the first user has the first emotion type. Other examples, may include analyzing the first user's one or more utterances for tone of voice (e.g., loud or yelling), word choice (e.g., states the word "angry" or "frustrated"), and/or talking speed (e.g., the first user is talking above a threshold talking speed). When the machine learning model utilized by the routing and scoring system 420 analyzes this user interaction data and/or one or more of these characteristics of the one or more utterances, the routing and scoring system 420 may label or determine that the user has a first emotion type (e.g., angry or frustrated). In some embodiments, the machine learning model takes into account whether the GPS data (as part of the user interaction data) indicates that the first user is at home or not and when the first user is at home the machine learning model may weigh that the user is more likely to not be angry as opposed to if the GPS data indicates the user is not at home. When the routing and scoring system 420 determines that the first user has the first emotion type, the method 100 may proceed to block 310 (analogous to block 116). When the routing and scoring system 420 determines that the first user does not have the first emotion type, the method 100 may proceed to block 312 (analogous to block 118).

In some embodiments, the routing and scoring system 420 may receive one or more audio signals from the first user via the first phone call. In some embodiments, the routing and scoring system 420 may determine whether the first user had the first emotion type based in part on the one or more audio signals. For example, the one or more audio signals may include background noise (e.g., traffic, music, and/or conversation). When the background noise in the one or more audio signals exceeds a predetermined decibel (db) threshold level (e.g., x db), the routing and scoring system 420 may, via the machine learning model, factor or weigh into the determination to determine whether the first user has the first emotion type. For example, if there the background noise exceed a certain decibel level, the user may be frustrated since he or she feels they have to call a customer service representative at a time that is less than ideal (i.e., not at home where a private and quiet conversation can take place).

Methods 100, 200, and 300 are described as involving phone calls from a user to a call center representative. However, it is envisioned that a similar process may be used to assign a live chat session representative. Obviously, the one or more utterances would be text messages from the user and there would not be any audio or phone number received via a phone call. A user would be authenticated (e.g., username and password or biometric login) via a mobile device or website rather than via a phone number.

Figure 4:
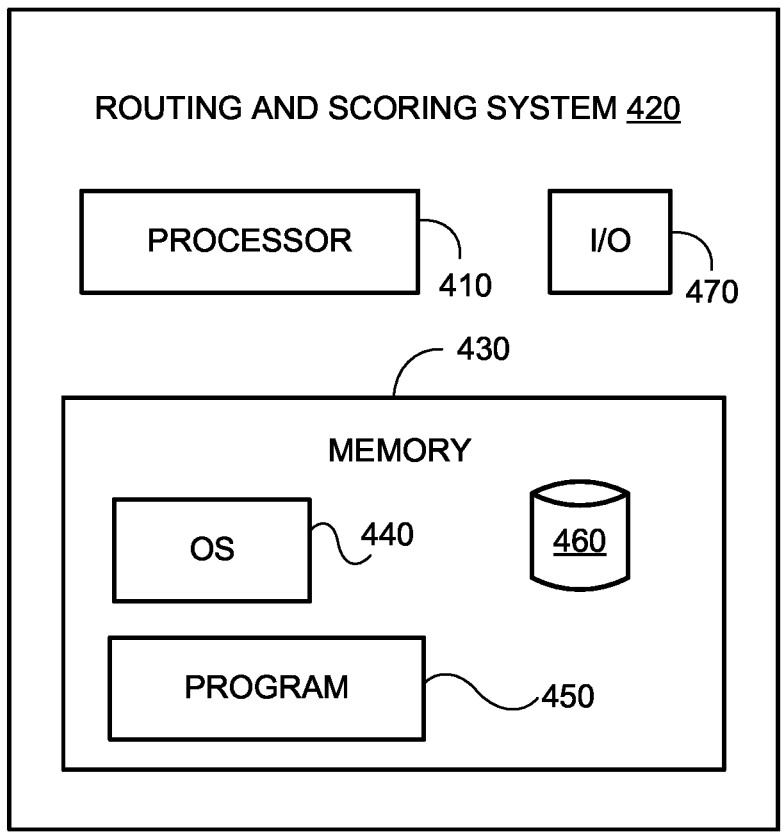
FIG. 4 is a block diagram of an example routing and scoring system used to route an incoming call and score a call representative following a call, according to an example implementation of the disclosed technology.
Figure 5:
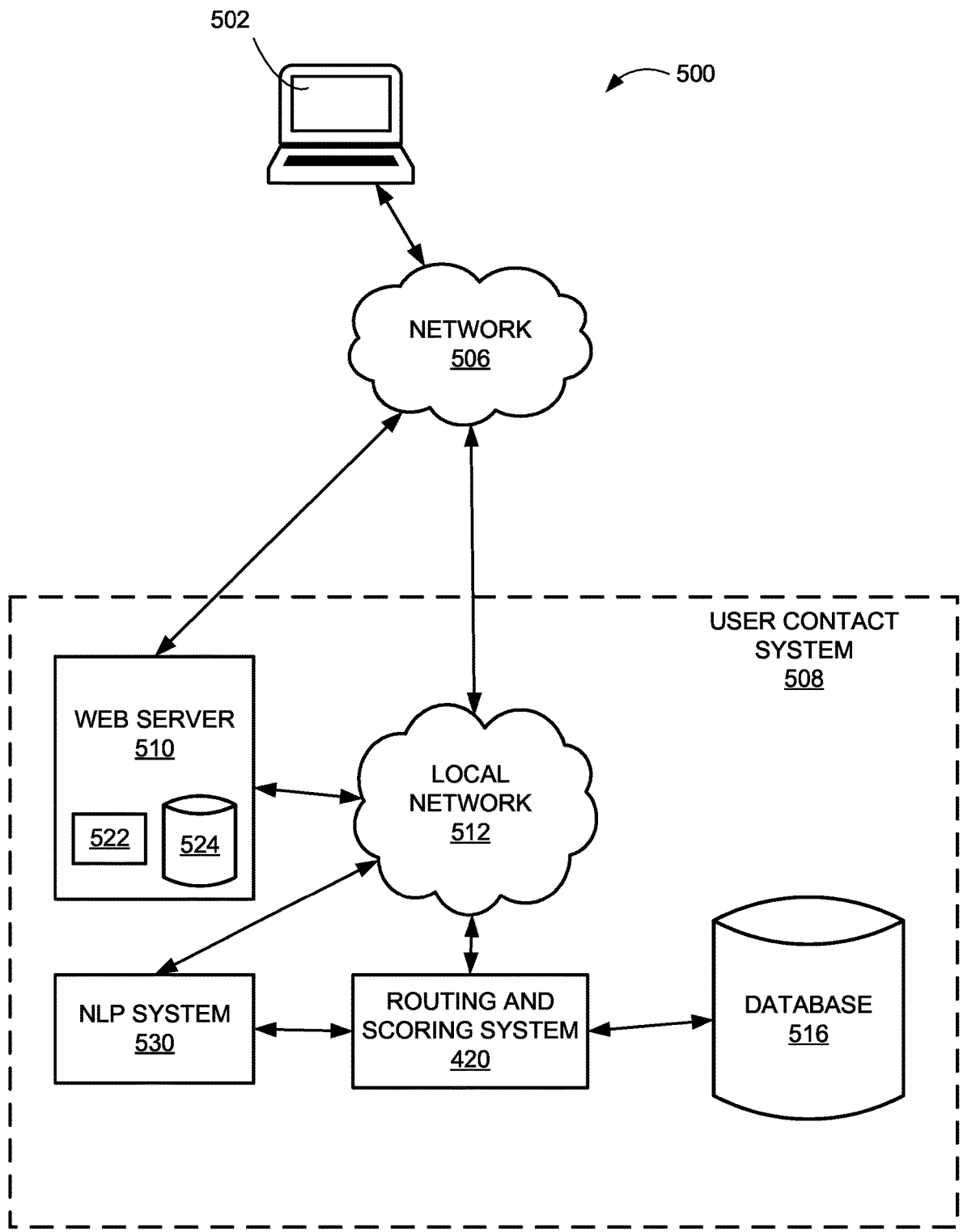
FIG. 5 is a block diagram of an example system that may be used to route an incoming call and score a call representative following a call, according to an example implementation of the disclosed technology.

FIG. 4 is a block diagram of an example routing and scoring system 420 used to route an incoming call and score a call representative following a call, according to an example implementation of the disclosed technology. According to some embodiments, the user device 502 and web server 510, as depicted in FIG. 5 and described below, may have a similar structure and components that are similar to those described with respect to routing and scoring system 420 shown in FIG. 4. As shown, the routing and scoring system 420 may include a processor 410, an input/output ("I/O") device 470, a memory 430 containing an operating system ("OS") 440 and a program 450. In certain example implementations, the routing and scoring system 420 may be a single server or may be configured as a distributed computer system including multiple servers or computers that interoperate to perform one or more of the processes and functionalities associated with the disclosed embodiments. In some embodiments routing and scoring system 420 may be one or more servers from a serverless or scaling server system. In some embodiments, the routing and scoring system 420 may further include a peripheral interface, a transceiver, a mobile network interface in communication with the processor 410, a bus configured to facilitate communication between the various components of the routing and scoring system 420, and a power source configured to power one or more components of the routing and scoring system 420.

A peripheral interface, for example, may include the hardware, firmware and/or software that enable(s) communication with various peripheral devices, such as media drives (e.g., magnetic disk, solid state, or optical disk drives), other processing devices, or any other input source used in connection with the disclosed technology. In some embodiments, a peripheral interface may include a serial port, a parallel port, a general-purpose input and output (GPIO) port, a game port, a universal serial bus (USB), a micro-USB port, a high definition multimedia (HDMI) port, a video port, an audio port, a Bluetooth™ port, a near-field communication (NFC) port, another like communication interface, or any combination thereof.

In some embodiments, a transceiver may be configured to communicate with compatible devices and ID tags when they are within a predetermined range. A transceiver may be compatible with one or more of: radio-frequency identification (RFID), near-field communication (NFC), Bluetooth™, low-energy Bluetooth™ (BLE), WiFi™, ZigBee™, ambient backscatter communications (ABC) protocols or similar technologies.

A mobile network interface may provide access to a cellular network, the Internet, or another wide-area or local area network. In some embodiments, a mobile network interface may include hardware, firmware, and/or software that allow(s) the processor(s) 410 to communicate with other devices via wired or wireless networks, whether local or wide area, private or public, as known in the art. A power source may be configured to provide an appropriate alternating current (AC) or direct current (DC) to power components.

The processor 410 may include one or more of a microprocessor, microcontroller, digital signal processor, co-processor or the like or combinations thereof capable of executing stored instructions and operating upon stored data. The memory 430 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein may be implemented as a combination of executable instructions and data stored within the memory 430.

The processor 410 may be one or more known processing devices, such as, but not limited to, a microprocessor from the Pentium™ family manufactured by Intel™ or the Turion™ family manufactured by AMD™. The processor 410 may constitute a single core or multiple core processor that executes parallel processes simultaneously. For example, the processor 410 may be a single core processor that is configured with virtual processing technologies. In certain embodiments, the processor 410 may use logical processors to simultaneously execute and control multiple processes. The processor 410 may implement virtual machine technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

In accordance with certain example implementations of the disclosed technology, the routing and scoring system 420 may include one or more storage devices configured to store information used by the processor 410 (or other components) to perform certain functions related to the disclosed embodiments. In one example, the routing and scoring system 420 may include the memory 430 that includes instructions to enable the processor 410 to execute one or more applications, such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

In one embodiment, the routing and scoring system 420 may include a memory 430 that includes instructions that, when executed by the processor 410, perform one or more processes consistent with the functionalities disclosed herein. Methods, systems, and articles of manufacture consistent with disclosed embodiments are not limited to separate programs or computers configured to perform dedicated tasks. For example, the routing and scoring system 420 may include the memory 430 that may include one or more programs 450 to perform one or more functions of the disclosed embodiments. For example, in some embodiments, the routing and scoring system 420 may additionally manage dialogue and/or other interactions with the customer via a program 450.

The processor 410 may execute one or more programs located remotely from the routing and scoring system 420. For example, the routing and scoring system 420 may access one or more remote programs that, when executed, perform functions related to disclosed embodiments.

The memory 430 may include one or more memory devices that store data and instructions used to perform one or more features of the disclosed embodiments. The memory 430 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational or non-relational databases. The memory 430 may include software components that, when executed by the processor 410, perform one or more processes consistent with the disclosed embodiments. In some embodiments, the memory 430 may include a routing and scoring database 460 for storing related data to enable the routing and scoring system 420 to perform one or more of the processes and functionalities associated with the disclosed embodiments.

The routing and scoring database 460 may include stored data relating to status data (e.g., average session duration data, location data, idle time between sessions, and/or average idle time between sessions) and historical status data. According to some embodiments, the functions provided by the routing and scoring database 460 may also be provided by a database that is external to the routing and scoring system 420, such as the database 516 as shown in FIG. 5.

The routing and scoring system 420 may also be communicatively connected to one or more memory devices (e.g., databases) locally or through a network. The remote memory devices may be configured to store information and may be accessed and/or managed by the routing and scoring system 420. By way of example, the remote memory devices may be document management systems, Microsoft™ SQL database, SharePoint™ databases, Oracle™ databases, Sybase™ databases, or other relational or non-relational databases. Systems and methods consistent with disclosed embodiments, however, are not limited to separate databases or even to the use of a database.

The routing and scoring system 420 may also include one or more I/O devices 470 that may comprise one or more interfaces for receiving signals or input from devices and providing signals or output to one or more devices that allow data to be received and/or transmitted by the routing and scoring system 420. For example, the routing and scoring system 420 may include interface components, which may provide interfaces to one or more input devices, such as one or more keyboards, mouse devices, touch screens, track pads, trackballs, scroll wheels, digital cameras, microphones, sensors, and the like, that enable the routing and scoring system 420 to receive data from a user (such as, for example, via the user device 502).

In example embodiments of the disclosed technology, the routing and scoring system 420 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

While the routing and scoring system 420 has been described as one form for implementing the techniques described herein, other, functionally equivalent, techniques may be employed. For example, some or all of the functionality implemented via executable instructions may also be implemented using firmware and/or hardware devices such as application specific integrated circuits (ASICs), programmable logic arrays, state machines, etc. Furthermore, other implementations of the routing and scoring system 420 may include a greater or lesser number of components than those illustrated.

FIG. 5 is a block diagram of an example system that may be used to route an incoming call and score a call representative following a call, according to an example implementation of the disclosed technology. The components and arrangements shown in FIG. 5 are not intended to limit the disclosed embodiments as the components used to implement the disclosed processes and features may vary. As shown, user contact system 508 may interact with a user device 502 via a network 506. In certain example implementations, the user contact system 508 may include a local network 512, a routing and scoring system 420, a web server 510, and a database 516.

In some embodiments, a user may operate the user device 502. The user device 502 can include one or more of a mobile device, smart phone, general purpose computer, tablet computer, laptop computer, telephone, PSTN landline, smart wearable device, voice command device, other mobile computing device, or any other device capable of communicating with the network 5506 and ultimately communicating with one or more components of the ATM management system 508. In some embodiments, the user device 502 may include or incorporate electronic communication devices for hearing or vision impaired users.

Customers may include individuals such as, for example, subscribers, clients, prospective clients, or customers of an entity associated with an organization, such as individuals who have obtained, will obtain, or may obtain a product, service, or consultation from or conduct a transaction in relation to an entity associated with the user contact system 508. According to some embodiments, the user device 502 may include an environmental sensor for obtaining audio or visual data, such as a microphone and/or digital camera, a geographic location sensor for determining the location of the device, an input/output device such as a transceiver for sending and receiving data, a display for displaying digital images, one or more processors, and a memory in communication with the one or more processors.

The network 506 may be of any suitable type, including individual connections via the internet such as cellular or WiFi networks. In some embodiments, the network 506 may connect terminals, services, and mobile devices using direct connections such as radio-frequency identification (RFID), near-field communication (NFC), Bluetooth™, low-energy Bluetooth™ (BLE), WiFi™, ZigBee™, ambient backscatter communications (ABC) protocols, USB, WAN, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

The network 506 may include any type of computer networking arrangement used to exchange data. For example, the network 506 may be the Internet, a private data network, virtual private network using a public network, and/or other suitable connection(s) that enable(s) components in the system 500 environment to send and receive information between the components of the system 500. The network 506 may also include a public switched telephone network ("PSTN") and/or a wireless network.

The user contact system 508 may be associated with and optionally controlled by one or more entities such as a business, corporation, individual, partnership, or any other entity that provides one or more of goods, services, and consultations to individuals such as customers. In some embodiments, the user contact system 508 may be controlled by a third party on behalf of another business, corporation, individual, partnership. The user contact system 508 may include one or more servers and computer systems for performing one or more functions associated with products and/or services that the organization provides.

Web server 510 may include a computer system configured to generate and provide one or more websites accessible to customers, as well as any other individuals involved in access system 508's normal operations. Web server 510 may include a computer system configured to receive communications from user device 502 via for example, a mobile application, a chat program, an instant messaging program, a voice-to-text program, an SMS message, email, or any other type or format of written or electronic communication. Web server 510 may have one or more processors 522 and one or more web server databases 524, which may be any suitable repository of website data. Information stored in web server 510 may be accessed (e.g., retrieved, updated, and added to) via local network 512 and/or network 506 by one or more devices or systems (e.g., authentication system 510) of system 500. In some embodiments, web server 510 may host websites or applications that may be accessed by the user device 102. For example, web server 510 may host a financial service provider website that a user device may access by providing an attempted login that are authenticated by the routing and scoring system 420. According to some embodiments, web server 510 may include software tools, similar to those described with respect to user device 502 above, that may allow web server 510 to obtain network identification data from user device 502.

The local network 512 may include any type of computer networking arrangement used to exchange data in a localized area, such as WiFi, Bluetooth™ Ethernet, and other suitable network connections that enable components of the user contact system 508 to interact with one another and to connect to the network 506 for interacting with components in the system 500 environment. In some embodiments, the local network 412 may include an interface for communicating with or linking to the network 506. In other embodiments, certain components of the user contact system 508 may communicate via the network 506, without a separate local network 506.

In accordance with certain example implementations of the disclosed technology, the user contact system 508 may include one or more computer systems configured to compile data from a plurality of sources the routing and scoring system 420, web server 510, and/or the database 516. The routing and scoring system 420 may correlate compiled data, analyze the compiled data, arrange the compiled data, generate derived data based on the compiled data, and store the compiled and derived data in a database such as the database 516. According to some embodiments, the database 516 may be a database associated with an organization and/or a related entity that stores a variety of information relating to customers, transactions, ATM, and business operations. The database 516 may also serve as a back-up storage device and may contain data and information that is also stored on, for example, database 460, as discussed with reference to FIG. 4.

With continued reference to FIG. 5, the system 500 may include a natural language processing system (NLP system) 530, which may include a computer system configured to receive and process incoming dialogue messages (e.g., one or more utterances) and determine a meaning of the incoming dialogue message. For example, the NLP system 530 may be configured to receive and execute a command containing an incoming dialogue message where the command instructs the NLP system 530 to determine the meaning of the incoming dialogue message. The NLP system 530 may be configured to continuously or intermittently listen for and receive commands from a command queue to determine if there are any new commands directed to the NLP system 530. Upon receiving and processing an incoming dialogue message, the NLP system 530 may output the meaning of an incoming dialogue message in a format that other devices can process. For example, the NLP system 530 may receive an incoming dialogue message stating "Hello, I would like to know my account balance please," and may determine that this statement represents a request for an account balance. In certain example implementations, the NLP system 530 may be configured to output an event representing the meaning of the incoming dialogue message to an event queue for processing by another device. In some embodiments, the NLP system 530 may be configured to generate a natural language phrase in response to receiving a command. Accordingly, in some embodiments, the NLP system 530 may be configured to output an event that contains data representing natural language dialogue.

In accordance with certain example implementations of the disclosed technology, the NLP system 530 may include one or more processors and one or more NLP databases, which may be any suitable repository of NLP data. Information stored in the NLP system 530 may be accessed (e.g., retrieved, updated, and added to) via local network 512 and/or network 506 by one or more devices or systems (e.g., the routing and scoring system 420) of the system 500. In some embodiments, an NLP processor may be used to implement an NLP system that can determine the meaning behind a string of text or voice message and convert it to a form that can be understood by other devices. In some embodiments, the NLP system 530 includes a natural language understanding component that generates an intent token based on analyzing user utterances. In some embodiments, the NLP system 530 includes a natural language generation component that the user's natural language by mapping one or more utterances to issues or issue tokens using the NLP system's 530 natural language understanding.

Although the preceding description describes various functions of a web server 510, a routing and scoring system 420, a database 516, and a natural language processing (NLP) system 530, in some embodiments, some or all of these functions may be carried out by a single computing device.

EXEMPLARY USE CASES

A user may be trying to conduct a transaction such as a money transfer via a mobile banking application on the user's mobile device (e.g., user device 502). However, the mobile application may not be working for the user for a variety of reasons (e.g., a bug, not enough money in the source account, user selected the wrong transfer option). Regardless, the user may repeatedly try to conduct the same transaction, which is recorded by the mobile banking application and sent to and received by one or more bank's servers (e.g., routing and rating system 420). Alternatively or additionally, the mobile application may record that the user is repeatedly shaking their mobile device via its gyroscope or accelerometer after being denied the ability to conduct the desired transaction and send the recorded gyroscopic or accelerometer data to and received by one or more bank's servers (e.g., routing and rating system 420). This user interaction data may be stored by one or more bank servers (e.g., routing and rating system 420) in one or more databases such as databases 460 and/or 516.

The user may call the bank's customer service number to help resolve their issues. In turn, the one or more bank servers (e.g., routing and rating system 420) may receive a phone call from the first user using a first phone number. The one or more bank servers (e.g., routing and rating system 420) may track a call duration of the phone call for call rating purposes and may identify the first user via the first phone number. The one or more bank servers (e.g., routing and rating system 420) may receive one or more utterances from the user via the phone call and identify one or more issues from the one or more utterances. For example, the user may state "I can't transfer money to my mother." Thus, the one or more bank servers (e.g., routing and rating system 420), utilizing an natural language processing (NLP), may identify that the user has been unable to transfer money to through the bank's mobile application as the issue based on the one or more user utterances.

The one or more bank servers (e.g., routing and rating system 420) may determine, using a first machine learning model (e.g., a deep learning model), whether the first user has a first emotion type (e.g., angry or frustrated) based on the user interaction data, a tone of voice associated with the one or more utterances, word choice associated with the one or more utterances, and/or talking speed associated with the one or more utterances. If determining a tone or emotion based off a transcript, the machine learning model may be trained using available labeled datasets (e.g., labeled twitter datasets) that train for sentiment. Alternatively, the one or more bank servers (e.g., routing and rating system 420) may use tone analysis algorithm that does not necessarily involve a machine learning model. Instead of using a transcript, the one or more bank servers (e.g., routing and rating system 420) could determine tone or emotion based on a waveform analysis of audio of a call. When the first user does not have the first emotion type, the one or more bank servers (e.g., routing and rating system 420) may route the phone call to any call center representative. When the first user has the first emotion type, the one or more bank servers (e.g., routing and rating system 420) may route the phone call to a call center representative associated with an average call score that is above a predetermined threshold.

Regardless of which representative the phone call is routed to, the one or more bank servers (e.g., routing and rating system 420) may prompt the first user for first feedback (e.g., a rating of 1 to 5 with 5 being most favorable) after the issue is resolved or the phone call ends and may receive the first feedback form the first user. The one or more bank servers (e.g., routing and rating system 420) may generate a call score for an assigned call center representative based the one or more issues, the call duration, the first feedback, and the determination of whether the first user had the first emotion type. The one or more bank servers (e.g., routing and rating system 420) may update the average call score associated with the assigned call center representative based on the call score. The one or more bank servers (e.g., routing and rating system 420) may prompt the assigned call center representative to provide second feedback (e.g., a yes or no) on whether the first user has the first emotion type and receive the second feedback from the assigned call center representative. Finally, the one or more bank servers (e.g., routing and rating system 420) may update the first machine learning model based on the first feedback, the second feedback, or both.

In some examples, disclosed systems or methods may involve one or more of the following clauses:

Clause 1: A system comprising: one or more processors; and memory in communication with the one or more processors and storing instructions that are configured to cause the system to: receive user interaction data associated with a first user using a first user device; receive a phone call from the first user using a first phone number; track a call duration of the phone call; identify the first user via the first phone number; receive one or more utterances via the phone call; identify one or more issues from the one or more utterances; determine, using a first machine learning model, whether the first user has a first emotion type based on the user interaction data, a tone of voice associated with the one or more utterances, word choice associated with the one or more utterances, talking speed associated with the one or more utterances, or combinations thereof; when the first user does not have the first emotion type, route the phone call to any call center representative; when the first user has the first emotion type, route the phone call to a call center representative associated with an average call score that is above a predetermined threshold; prompt the first user for first feedback after the issue is resolved or the phone call ends; receive the first feedback from the first user; generate a call score for an assigned call center representative based the one or more issues, the call duration, the first feedback, and the determination of whether the first user had the first emotion type; update the average call score associated with the assigned call center representative based on the call score; prompt the assigned call center representative to provide second feedback on whether the first user has the first emotion type; receive the second feedback from the assigned call center representative; and update the first machine learning model based on the first feedback, the second feedback, or both.

Clause 2: The system of clause 1, wherein the user interaction data comprises chat data associated with the first user and via a textual chat session.

Clause 3: The system of clause 1, wherein: the user interaction data comprises global positioning system (GPS) data associated with the first user device, and determining whether the first user has the first emotion type is based in part on the GPS data.

Clause 4: The system of clause 1, wherein: the instructions are further configured to cause the system to receive one or more audio signals from the first user via the phone call, and determining whether the first user has the first emotion type is based in part on the one or more audio signals.

Clause 5: The system of clause 4, wherein: the one or more audio signals comprise background noise; the instructions are further configured to cause the system to determine whether the background noise in the one or more audio signals exceeds a predetermined threshold level; and determining whether the first user has the first emotion type is based on the determination of whether the background noise exceeds the predetermined threshold level.

Clause 6: A system, comprising: one or more processors; and memory in communication with the one or more processors and storing instructions that are configured to cause the system to: receive user interaction data associated with a first user using a first user device; receive a phone call from a user using a first phone number; receive one or more utterances from the first user via the phone call; identify the user via the first phone number; track a call duration for the phone call; identify one or more issues from the one or more utterances; determine, using a first machine learning model, whether the first user has a first emotion type based on the user interaction data; when the first user does not have the first emotion type, route the first user to any call center representative; when the first user has the first emotion type, route the first user to a call center representative associated with an average call score that is above a predetermined threshold; prompt the first user for first feedback after the issue is resolved or the phone call ends; receive the first feedback from the first user; generate a call score for an assigned call center representative based the one or more issues, the call duration, the first feedback, and the determination of whether the first user had the first emotion type; and update the average call score associated with the assigned call center representative.

Clause 7: The system of clause 6, wherein determining whether the first user has the first emotion type is based on a tone of voice associated with the one or more utterances, word choice associated with the one or more utterances, talking speed associated with the one or more utterances, or combinations thereof.

Clause 8: The system of clause 6, wherein the user interaction data comprises chat data associated with the user and via a textual chat session.

Clause 9: The system of clause 6, wherein: the user interaction data comprises global positioning system (GPS) data associated with the first user device, and determining whether the first user has the first emotion type is based in part on the GPS data.

Clause 10: The system of clause 6, wherein the memory stores further instructions that are further configured to cause the system to receive one or more audio signals from the user via the phone call.

Clause 11: The system of clause 10, wherein the one or more audio signals comprises background noise determining whether the first user has a first emotion type is based on whether the background noise exceeds a threshold amount.

Clause 12: The system of clause 6, wherein the memory stores further instructions that are further configured to cause the system to: prompt the assigned call center representative to provide second feedback on whether the first user had the first emotion type; receive the second feedback from the assigned call center representative; and update the first machine learning model based on the first feedback, the second feedback, or both.

Clause 13: A system, comprising: one or more processors; and memory in communication with the one or more processors and storing instructions that are configured to cause the system to: receive user interaction data associated with a first user using a first user device; receive a phone call from a user using a first phone number; identify the user via the first phone number; determine, using a first machine learning model, whether the first user has a first emotion type based on the user interaction data; when the first user does not have the first emotion type, route the first user to any call center representative; and when the first user has the first emotion type, route the first user to a first call center representative among one or more first call center representatives.

Clause 14: The system of clause 13, wherein the user interaction data comprises chat data associated with the user and via a textual chat session.

Clause 15: The system of clause 13, wherein: the user interaction data comprises global positioning system (GPS) data associated with the first user device, and determining whether the first user has the first emotion type is based in part on the GPS data.

Clause 16: The system of clause 13, the instructions are further configured to cause the system to receive one or more audio signals from the first user via the phone call, and determining whether the first user has the first emotion type is based in part on the one or more audio signals.

Clause 17: The system of clause 16, wherein the audio signals comprises background noise and determining whether the first user has a first emotion is based on whether the background noise exceeds a threshold amount.

Clause 18: The system of clause 13, wherein the memory stores further instructions that are further configured to cause the system to receive one or more utterances from the first user via the phone call.

Clause 19: The system of clause 18, wherein determining whether the first user has a first emotion type is based on a tone of voice associated with the one or more utterances, word choice associated with the one or more utterances, talking speed associated with the one or more utterances, or combinations thereof.

Clause 20: The system of clause 19, wherein the memory stores further instructions that are further configured to cause the system to: identify one or more issues from the one or more utterances; track a call duration for the phone call; prompt the first user for first feedback after the issue is resolved or the phone call ends; receive the first feedback from the first user; generate a call score for an assigned call center representative based the one or more issues, the call duration, the first feedback, and the determination on whether the first user has the first emotion type; update an average call score associated with the assigned call center representative; prompt the assigned call center representative to provide second feedback on whether the first user was angry or frustrated; receive the second feedback from the assigned call center representative; and update the first machine learning model based on the first feedback, the second feedback, or both, and wherein the one or more first call center representatives have average call scores above a predetermined threshold. The features and other aspects and principles of the disclosed embodiments may be implemented in various environments. Such environments and related applications may be specifically constructed for performing the various processes and operations of the disclosed embodiments or they may include a general-purpose computer or computing platform selectively activated or reconfigured by program code to provide the necessary functionality. Further, the processes disclosed herein may be implemented by a suitable combination of hardware, software, and/or firmware. For example, the disclosed embodiments may implement general purpose machines configured to execute software programs that perform processes consistent with the disclosed embodiments. Alternatively, the disclosed embodiments may implement a specialized apparatus or system configured to execute software programs that perform processes consistent with the disclosed embodiments. Furthermore, although some disclosed embodiments may be implemented by general purpose machines as computer processing instructions, all or a portion of the functionality of the disclosed embodiments may be implemented instead in dedicated electronics hardware.

The disclosed embodiments also relate to tangible and non-transitory computer readable media that include program instructions or program code that, when executed by one or more processors, perform one or more computer-implemented operations. The program instructions or program code may include specially designed and constructed instructions or code, and/or instructions and code well-known and available to those having ordinary skill in the computer software arts. For example, the disclosed embodiments may execute high level and/or low-level software instructions, such as machine code (e.g., such as that produced by a compiler) and/or high-level code that can be executed by a processor using an interpreter.

The technology disclosed herein typically involves a high-level design effort to construct a computational system that can appropriately process unpredictable data. Mathematical algorithms may be used as building blocks for a framework, however certain implementations of the system may autonomously learn their own operation parameters, achieving better results, higher accuracy, fewer errors, fewer crashes, and greater speed.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology described above with reference to user devices may include mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra-mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

It is to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Although embodiments are described herein with respect to systems or methods, it is contemplated that embodiments with identical or substantially similar features may alternatively be implemented as systems, methods and/or non-transitory computer-readable media.

As used herein, unless otherwise specified, the use of the ordinal adjectives "first," "second," "third," etc., to describe a common object, merely indicates that different instances of like objects are being referred to, and is not intended to imply that the objects so described must be in a given sequence, either temporally, spatially, in ranking, or in any other manner.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system comprising:
one or more processors; and
memory in communication with the one or more processors and storing instructions that are configured to cause the system to:
receive user interaction data associated with a first user using a first user device;
receive a phone call from the first user using a first phone number;
track a call duration of the phone call;
identify the first user via the first phone number;
receive one or more utterances via the phone call;
identify one or more issues from the one or more utterances;
determine, using a first machine learning model, whether the first user has a first emotion type based on the user interaction data, a tone of voice associated with the one or more utterances, word choice associated with the one or more utterances, talking speed associated with the one or more utterances, or combinations thereof;
when the first user does not have the first emotion type, route the phone call to any call center representative;
when the first user has the first emotion type, route the phone call to a call center representative associated with an average call score that is above a predetermined threshold;

prompt the first user for first feedback after the issue is resolved or the phone call ends;

receive the first feedback from the first user;

generate a call score for an assigned call center representative based the one or more issues, the call duration, the first feedback, and the determination of whether the first user had the first emotion type;

update the average call score associated with the assigned call center representative based on the call score;

prompt the assigned call center representative to provide second feedback on whether the first user has the first emotion type;

receive the second feedback from the assigned call center representative; and update the first machine learning model based on the first feedback, the second feedback, or both.

2. The system of claim 1, wherein the user interaction data comprises chat data associated with the first user and via a textual chat session.

3. The system of claim 1, wherein:

the user interaction data comprises global positioning system (GPS) data associated with the first user device, and determining whether the first user has the first emotion type is based in part on the GPS data.

4. The system of claim 1, wherein:

the instructions are further configured to cause the system to receive one or more audio signals from the first user via the phone call, and determining whether the first user has the first emotion type is based in part on the one or more audio signals.

5. The system of claim 4, wherein:

the one or more audio signals comprise background noise;

the instructions are further configured to cause the system to determine whether the background noise in the one or more audio signals exceeds a predetermined threshold level; and determining whether the first user has the first emotion type is based on the determination of whether the background noise exceeds the predetermined threshold level.

6. A system, comprising:

one or more processors; and memory in communication with the one or more processors and storing instructions that are configured to cause the system to:

receive user interaction data associated with a first user using a first user device;

receive a phone call from a user using a first phone number;

receive one or more utterances from the first user via the phone call identify the user via the first phone number;

track a call duration for the phone call;

identify one or more issues from the one or more utterances;

determine, using a first machine learning model, whether the first user has a first emotion type based on the user interaction data;

when the first user does not have the first emotion type, route the first user to any call center representative;

when the first user has the first emotion type, route the first user to a call center representative associated with an average call score that is above a predetermined threshold;

prompt the first user for first feedback after the issue is resolved or the phone call ends;

receive the first feedback from the first user;

generate a call score for an assigned call center representative based the one or more issues, the call duration, the first feedback, and the determination of whether the first user had the first emotion type; and update the average call score associated with the assigned call center representative.

7. The system of claim 6, wherein determining whether the first user has the first emotion type is based on a tone of voice associated with the one or more utterances, word choice associated with the one or more utterances, talking speed associated with the one or more utterances, or combinations thereof.

8. The system of claim 6, wherein the user interaction data comprises chat data associated with the user and via a textual chat session.

9. The system of claim 6, wherein:

the user interaction data comprises global positioning system (GPS) data associated with the first user device, and determining whether the first user has the first emotion type is based in part on the GPS data.

10. The system of claim 6, wherein the memory stores further instructions that are further configured to cause the system to receive one or more audio signals from the user via the phone call.

11. The system of claim 10, wherein the one or more audio signals comprises background noise determining whether the first user has a first emotion type is based on whether the background noise exceeds a threshold amount.

12. The system of claim 6, wherein the memory stores further instructions that are further configured to cause the system to:

prompt the assigned call center representative to provide second feedback on whether the first user had the first emotion type;

receive the second feedback from the assigned call center representative; and update the first machine learning model based on the first feedback, the second feedback, or both.

13. A system, comprising:

one or more processors; and memory in communication with the one or more processors and storing instructions that are configured to cause the system to:

receive user interaction data associated with a first user using a first user device;

receive a phone call from a user using a first phone number;

identify the user via the first phone number;

determine, using a first machine learning model, whether the first user has a first emotion type based on the user interaction data;

when the first user does not have the first emotion type, route the first user to any call center representative; and when the first user has the first emotion type, route the first user to a first call center representative among one or more first call center representatives.

14. The system of claim 13, wherein the user interaction data comprises chat data associated with the user and via a textual chat session.

15. The system of claim 13, wherein:
the user interaction data comprises global positioning system (GPS) data associated with the first user device, and
determining whether the first user has the first emotion type is based in part on the GPS data.

16. The system of claim 13, the instructions are further configured to cause the system to receive one or more audio signals from the first user via the phone call, and determining whether the first user has the first emotion type is based in part on the one or more audio signals.

17. The system of claim 16, wherein the audio signals comprises background noise and determining whether the first user has a first emotion is based on whether the background noise exceeds a threshold amount.

18. The system of claim 13, wherein the memory stores further instructions that are further configured to cause the system to receive one or more utterances from the first user via the phone call.

19. The system of claim 18, wherein determining whether the first user has a first emotion type is based on a tone of voice associated with the one or more utterances, word choice associated with the one or more utterances, talking speed associated with the one or more utterances, or combinations thereof.

20. The system of claim 19, wherein the memory stores further instructions that are further configured to cause the system to:
identify one or more issues from the one or more utterances;
track a call duration for the phone call;
prompt the first user for first feedback after the issue is resolved or the phone call ends;
receive the first feedback from the first user;
generate a call score for an assigned call center representative based the one or more issues, the call duration, the first feedback, and the determination on whether the first user has the first emotion type;
update an average call score associated with the assigned call center representative;
prompt the assigned call center representative to provide second feedback on whether the first user was angry or frustrated;
receive the second feedback from the assigned call center representative; and
update the first machine learning model based on the first feedback, the second feedback, or both, and
wherein the one or more first call center representatives have average call scores above a predetermined threshold.

* * * * *